US012593229B2

(12) United States Patent     (10) Patent No.:   US 12,593,229 B2
Kahn et al.               (45) Date of Patent:     Mar. 31, 2026

(54) NETWORK DATA ANALYTICS PROFILING

(71) Applicant: Nokia Technologies Oy, Espoo (FI)

(72) Inventors: Colin Kahn, Morris Plains, NJ (US);
Saurabh Khare, Bangalore (IN);
Gerald Kunzmann, Augsburg (DE)

(73) Assignee: Nokia Technologies Oy, Espoo (FI)

( * ) Notice: Subject to any disclaimer, the term of this
patent is extended or adjusted under 35
U.S.C. 154(b) by 345 days.

(21) Appl. No.: 18/190,674

(22) Filed: Mar. 27, 2023

(65) Prior Publication Data

US 2023/0319612 A1     Oct. 5, 2023

(30) Foreign Application Priority Data

Mar. 29, 2022    (IN)  .............................. 202241018383

(51) Int. Cl.
| | |
|---|---|
| *H04W 24/08* | (2009.01) |
| *H04L 67/303* | (2022.01) |
| *H04W 8/08* | (2009.01) |
| *H04W 8/12* | (2009.01) |
| *H04W 8/18* | (2009.01) |
| *H04W 8/24* | (2009.01) |
| *H04W 84/04* | (2009.01) |

(52) U.S. Cl.
CPC ............. *H04W 24/08* (2013.01); *H04W 8/08*
(2013.01); *H04W 8/24* (2013.01); *H04W
84/042* (2013.01)

(58) Field of Classification Search
None
See application file for complete search history.

(56) References Cited

U.S. PATENT DOCUMENTS

| | | | | |
|---|---|---|---|---|
| 12,041,466 | B2 * | 7/2024 | Salkintzis | ............. H04W 24/10 |
| 12,445,841 | B2 * | 10/2025 | Kim | ....................... H04W 12/10 |

(Continued)

FOREIGN PATENT DOCUMENTS

| | | | | |
|---|---|---|---|---|
| CN | 103314612 | A * | 9/2013 | ............ H04W 4/021 |
| CN | 103581985 | A * | 2/2014 | .............. H04W 8/10 |

(Continued)

OTHER PUBLICATIONS

"3rd Generation Partnership Project; Technical Specification Group
Services and System Aspects; Architecture enhancements for 5G
System (5GS) to support network data analytics services (Release
17)", 3GPP TS 23.288, V17.3.0, Dec. 2021, pp. 1-204.

(Continued)

*Primary Examiner* — Mohammed Rachedine
(74) *Attorney, Agent, or Firm* — Nokia Technologies Oy

(57) ABSTRACT

Systems, methods, apparatuses, and computer program
products for network data analytics profiling for a user
equipment (UE) are provided. One method may include
obtaining data related to a UE and generating analytics for
the UE based on the obtained data, generating a UE analytics
profile for the UE using at least one of the obtained data
and/or the analytics generated for the UE, and storing the UE
analytics profile in a repository. The method may also
include receiving, from a network node in the visited net-
work, a request to retrieve the UE analytics profile for the
visited network. The method may then include generating
the visited network UE analytics profile, and providing the
visited network UE analytics profile to the network node in
the visited network.

13 Claims, 4 Drawing Sheets

(56)                 References Cited

U.S. PATENT DOCUMENTS

| | | | | |
|---|---|---|---|---|
| 2012/0208503 A1* | 8/2012 | Johansson | ............... | H04W 8/04 |
| | | | | 455/411 |
| 2022/0022027 A1* | 1/2022 | Xin | ......................... | H04W 8/12 |

FOREIGN PATENT DOCUMENTS

| | | | | | |
|---|---|---|---|---|---|
| WO | WO-2013014119 A1 * | 1/2013 | ............ | H04W 24/08 |
| WO | 2021/063083 A1 | 4/2021 | | |
| WO | WO-2022173258 A1 * | 8/2022 | ......... | H04L 41/0853 |

OTHER PUBLICATIONS

Extended European Search Report received for corresponding European Patent Application No. 23163037.7, dated Jul. 20, 2023, 8 pages.
"3rd Generation Partnership Project; Technical Specification Group Services and System Aspects; Architecture enhancements for 5G System (5GS) to support network data analytics services (Release 17)", 3GPP TS 23.288, V17.4.0, Mar. 2022, pp. 1-205.

* cited by examiner

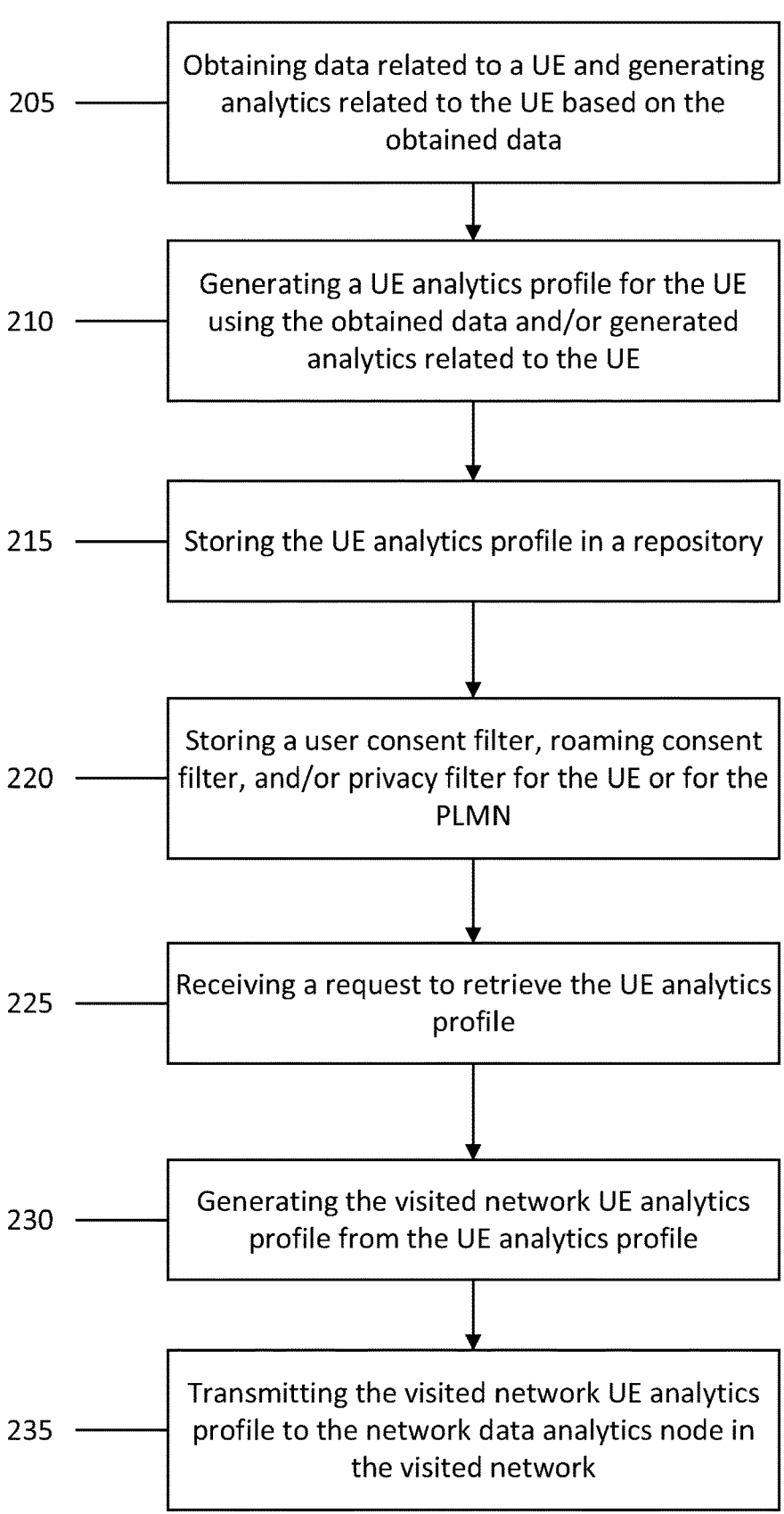

205 — Obtaining data related to a UE and generating analytics related to the UE based on the obtained data 210 — Generating a UE analytics profile for the UE using the obtained data and/or generated analytics related to the UE 215 — Storing the UE analytics profile in a repository 220 — Storing a user consent filter, roaming consent filter, and/or privacy filter for the UE or for the PLMN 225 — Receiving a request to retrieve the UE analytics profile 230 — Generating the visited network UE analytics profile from the UE analytics profile 235 — Transmitting the visited network UE analytics profile to the network data analytics node in the visited network

Fig. 2

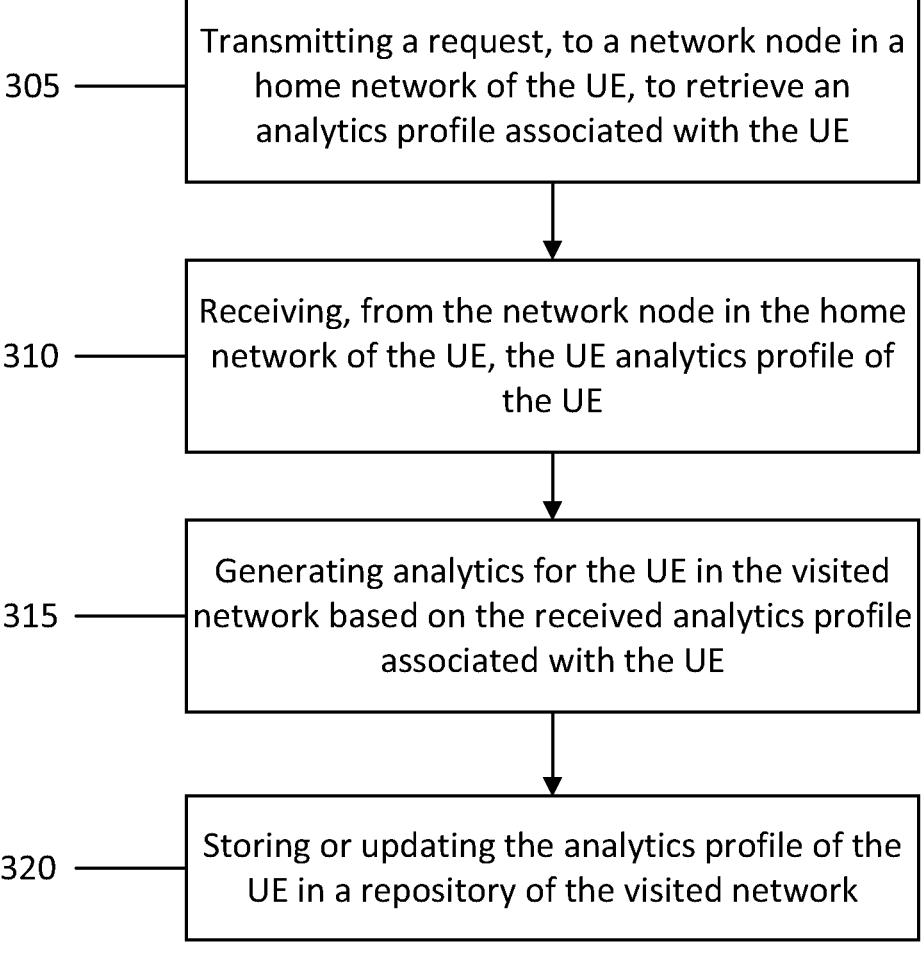

305 — Transmitting a request, to a network node in a home network of the UE, to retrieve an analytics profile associated with the UE 310 — Receiving, from the network node in the home network of the UE, the UE analytics profile of the UE 315 — Generating analytics for the UE in the visited network based on the received analytics profile associated with the UE 320 — Storing or updating the analytics profile of the UE in a repository of the visited network

Fig. 3

NETWORK DATA ANALYTICS PROFILING

RELATED APPLICATIONS

This application claims the benefit of priority of Indian Patent Application No. 202241018383, filed Mar. 29, 2022, which is hereby incorporated by reference as if reproduced in its entirety.

FIELD

Some example embodiments may generally relate to communications including mobile or wireless telecommunication systems, such as Long Term Evolution (LTE) or fifth generation (5G) radio access technology or new radio (NR) access technology or 5G beyond (e.g., 6G) access technology, or other communications systems. For example, certain example embodiments may generally relate to systems and/or methods for network data analytics profiling.

BACKGROUND

Examples of mobile or wireless telecommunication systems may include a Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or fifth generation (5G) radio or new radio (NR), 5G beyond and/or sixth generation (6G) mobile or telecommunication systems. 5G mobile or wireless telecommunication systems refer to the next generation (NG) of radio access systems and network architecture. A 5G mobile or wireless telecommunication system (generally referred to as a 5G system) may be mostly built on a 5G new radio (5G NR), but a 5G (or NG) system can also build on the E-UTRA. It is estimated that 5G NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). 5G NR is expected to deliver extreme broadband and ultra-robust, low latency connectivity and massive networking to support the Internet of Things (IoT). With IoT and machine-to-machine (M2M) communication becoming more widespread, there will be a growing need for radio access networks that meet the needs of lower power, low data rate, and long battery life. A next generation radio access network (NG-RAN) represents the RAN for a 5G system, which can provide both NR and LTE (and LTE-Advanced) radio access. It is noted that, in a NG-RAN, the nodes that can provide radio access functionality to a user equipment (i.e., similar to the Node B, NB, in UTRAN or the evolved NB, eNB, in LTE) may be named next-generation NB (gNB) when built on NR radio access technology and may be named next-generation eNB (NG-eNB) when built on E-UTRA. 5G beyond or 6G systems are expected to support further use cases beyond current mobile use scenarios, such as virtual and augmented reality, artificial intelligence, instant communications, improved support of IoT, etc.

SUMMARY

An embodiment may include an apparatus including at least one processor and at least one memory comprising computer program code. The at least one memory and computer program code may be configured, with the at least one processor, to cause the apparatus at least to: obtain data related to a user equipment (UE) and generate analytics for the user equipment (UE) based on the obtained data, generate a user equipment (UE) analytics profile for the user equipment (UE) using at least one of the obtained data and analytics generated for the user equipment (UE), and store the user equipment (UE) analytics profile in a repository. The at least one memory and computer program code may also be configured, with the at least one processor, to cause the apparatus at least to receive, from a node in the visited network, a request for a visited network user equipment (UE) analytics profile, generate the visited network user equipment (UE) analytics profile from the user equipment (UE) analytics profile, and transmit the visited network user equipment (UE) analytics profile to the node in the visited network.

An embodiment may include a method including obtaining, by a network node, data related to a user equipment (UE) and generating analytics for the user equipment (UE) based on the obtained data, generating a user equipment (UE) analytics profile for the user equipment (UE) using at least one of the obtained data and the analytics generated for the user equipment (UE), and storing the user equipment (UE) analytics profile in a repository. The method may also include receiving, from a node in the visited network, a request for a visited network user equipment (UE) analytics profile, generating the visited network user equipment (UE) analytics profile from the user equipment (UE) analytics profile, and sending the visited network user equipment (UE) analytics profile to node in the visited network.

An embodiment may include an apparatus including means for obtaining data related to a user equipment (UE) and for generating analytics for the user equipment (UE) based on the obtained data, means for generating a user equipment (UE) analytics profile for the user equipment (UE) using at least one of the data and the analytics generated for the user equipment (UE), and means for storing the user equipment (UE) analytics profile. The apparatus may also include means for receiving, from a node in the visited network, a request to retrieve a visited network user equipment (UE) analytics profile, means for preparing the visited network user equipment (UE) analytics profile from the user equipment (UE) analytics profile, and means for providing the visited network user equipment (UE) analytics profile to the node in the visited network.

An embodiment may include an apparatus including at least one processor and at least one memory comprising computer program code. The at least one memory and computer program code may be configured, with the at least one processor, to cause the apparatus at least to: when or after a user equipment (UE) attaches to a visited network, send a request, to a network node in a home network of the user equipment (UE), to retrieve an analytics profile of the user equipment (UE), receive, from the network node in the home network of the user equipment (UE), the analytics profile of the user equipment (UE), and generating analytics for the user equipment (UE) in the visited network based on the received analytics profile of the user equipment (UE).

An embodiment may include a method including, when or after a user equipment (UE) attaches to a visited network, transmitting, by a network node in the visited network, a request, to a network node in a home network of the user equipment (UE), to retrieve an analytics profile of the user equipment (UE), receiving, from the network node in the home network of the user equipment (UE), the analytics profile of the user equipment (UE), and generating analytics for the user equipment (UE) in the visited network based on the received analytics profile of the user equipment (UE).

An embodiment may include an apparatus including, when or after a user equipment (UE) attaches to a visited network, means for transmitting a request, to a network node in a home network of the user equipment (UE), to retrieve an analytics profile of the user equipment (UE), means for receiving, from the network node in the home network of the user equipment (UE), the analytics profile of the user equipment (UE), and means for generating analytics for the user equipment (UE) in the visited network based on the received analytics profile of the user equipment (UE).

BRIEF DESCRIPTION OF THE DRAWINGS

For proper understanding of example embodiments, reference should be made to the accompanying drawings, wherein:

FIG. 2 illustrates an example flow diagram of a method, according to an embodiment;

FIG. 3 illustrates an example flow diagram of a method, according to an embodiment.

DETAILED DESCRIPTION

Figure 1:
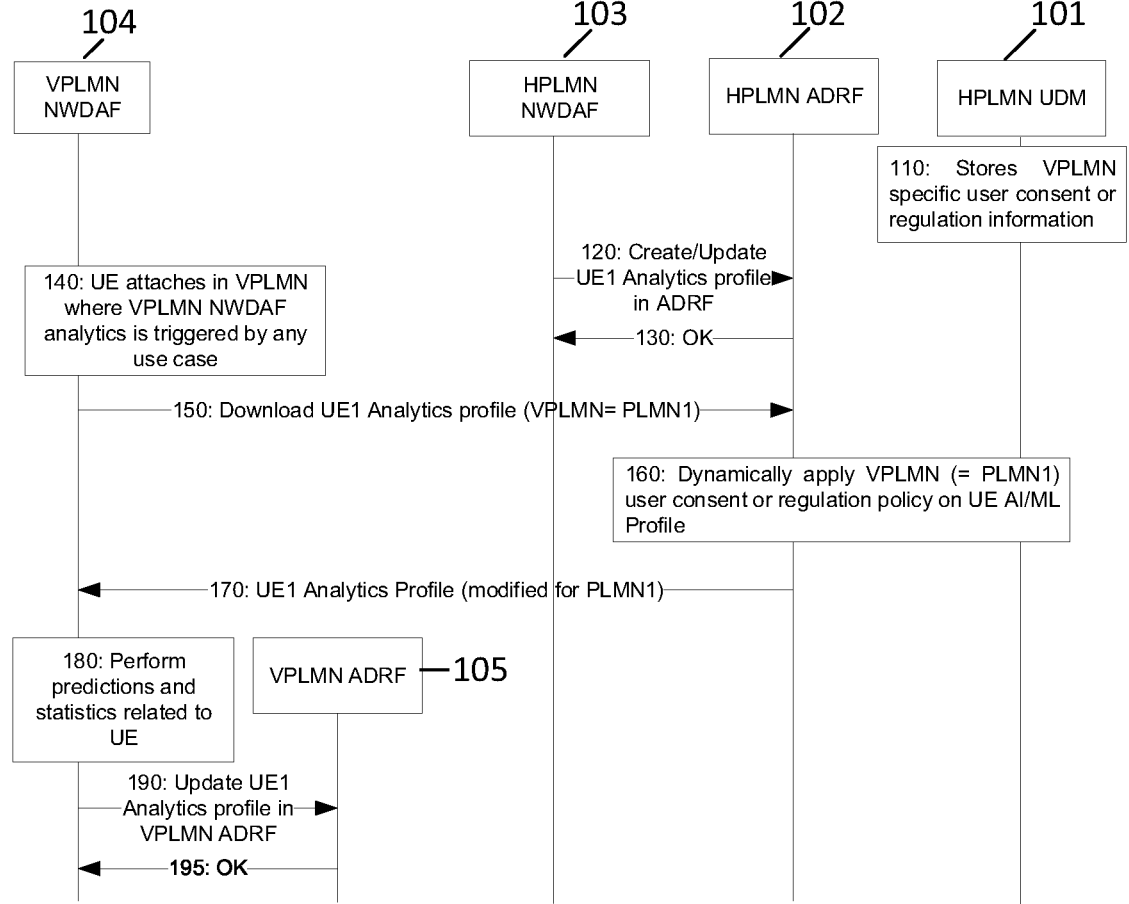
FIG. 1 illustrates an example signaling diagram, according to one example embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for network data analytics profiling, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

A network data analytics function (NWDAF) of a 5G core network (5GC) provides analytics to other network functions (NFs) of a 5GC applications functions (AFs), and operations, administration, and maintenance (OAM) systems. More specifically, the NWDAF may obtain data from data sources such as an access and mobility management function (AMF), a session management function (SMF), a policy control function (PCF), a unified data management (UDM), an application function (AF), and OAM system. The NWDAF may then provide analytics to service consumers (e.g., consumers of data analytics services offered by the NWDAF), such as NFs or an OAM system. For example, the NWDAF may obtain data related to one or more UEs that is obtained from NFs to determine different types of analytics for the UE(s). The NWDAF may generate analytics for the UE(s) based on the obtained data related to the UE(s) and may provide the analytics for the UEs to a service consumer that subscribes to NWDAF to obtain analytics for the UEs from the NWDAF. A service consumer may refer to any entity or NF that subscribes to a service offered by the NWDAF.

In addition, government regulations may require user consent for collecting UE related data and/or using the UE related data. User consent is currently required for two specific purposes: generating analytics based on UE related data, or training artificial intelligence (AI) or machine learning (ML) models using UE related data (generally referred to as model training).

When a UE enters a visited public land mobile network (VPLMN) (i.e., the UE is roaming), the VPLMN does not have any historical data related to the UE that can be used for generating analytics (e.g., statistics), or machine learning (ML) models for UE that it can use to generate analytics (e.g., predictions) for the UE. In this case, the NWDAF in the VPLMN or any AI/ML engine of the VPLMN, such as a management data analytics service (MDAS) or management data analytics function (MDAF), may not be able to generate accurate analytics (e.g., generate accurate statistics or predictions) initially. Therefore, confidence in generated analytics (e.g., confidence in the statistics or the predictions) or the accuracy of the generated analytics (e.g., the accuracy statistics or predictions) will be very low.

However, a home public land mobile network (HPLMN) for the UE may have obtained and stored UE related data, since the HPLMN may know the UE's patterns (e.g., what kind of activity the UE performs or what kind of interest the user of the UE has, such as shopping, sports, etc.). In the case of data analytics, the HPLMN may have already obtained data related to the UE, trained a ML model using data related to the UE, and/or generated analytics for the UE (e.g., statistics and/or predictions for the UE).

There is currently no mechanism for a HPLMN to share UE related data and/or analytics generated based on the UE related data with a NWDAF, of a VLPMN (generally referred to as a V-NWDAF), so that the V-NWDAF can immediately generate accurate analytics for the UE. Thus, as discussed in detail below, example embodiments can be configured to provide at least a method for a NWDAF of a HPLMN (generally referred to as H-NWDAF) to share analytics for a UE and/or UE related data for a UE with the V-NWDAF via an analytics profile for the UE (generally referred to as UE analytics profile). It is noted that an analytics profile, as referred to herein, may be a profile containing analytics (which may be an output of the NWDAF), may contain information from data used as an input to the NWDAF, and/or may include a ML model.

Another example may be when a user of a UE is on vacation and the UE is roaming across multiple countries, such as multiple countries in Europe that are part of the European Union. If the user stays in one country (i.e., country 1) for three days and the UE is communicating with a V-PLMN of the country (i.e., country 1), then the accuracy of analytics for the UE generated by the V-NWDAF of the V-PLMN of the country (i.e., country 1) will gradually increase. For example, the accuracy of the analytics may gradually increase as the V-NWDAF is able to obtain more data related to the UE over the days that the UE is communication with the V-PLMN. However, when the user of the UE moves to another neighbouring country i.e., country 2, and the UE communicates with a VPLMN of the neighbouring country (i.e., country 2), then the NWDAF of the VPLMN in country 2 has no data or analytics for the UE, so the accuracy of initial analytics generated by the V-NWDAF of the VPLMN in the neighbouring country (i.e., country 2) will again be low.

Another associated problem is that UE related data used to generate analytics for the UE can be extremely large and cannot be easily shared between a HPLMN and VPLMNs. Currently, there is no mechanism available where a large amount of UE related data can be transferred in the 5GS control plane between a HPLMN and VPLMNs, for example.

Additionally, there may also be security concerns with sharing the data related to a UE, i.e., raw user data, with VPLMNs. For example, what are the reasons that a HPLMN wants to share UE related data (e.g., the UE visited the mall in country 1 and purchased xyz item) with another PLMN, such as a VPLMN. Such UE related data may be obtained from an AF, for instance.

Furthermore, certain embodiments can provide for a new business model for operators of HPLMNs and VPLMNs. For example, an operator of a HPLMN can share analytics data with an operator of a first VPLMN (preferred network) where the operator of the HPLMN has a better (in terms of revenue) roaming agreement with the operator of the first VPLMN compared to an operator of a second VPLMN (less preferred network) in the same region as the operator of the first VPLMN.

It is noted that some embodiments can also be applied to NWDAF accuracy use case of Third Generation Partnership Project (3GPP) Release-18, along with the roaming use case. A NF consumer requesting analytics can specify a preferred accuracy level (e.g., low, medium, high, or highest) of predictions, and the NWDAF can provide a probability information expressing the confidence in its predictions. The probability may be provided to the NF consumer with the analytics prediction(s) as part of the analytics report. For example, accuracy may provide an indication of how well the actual outcome matched a prediction. Example embodiments can overcome the challenge of achieving the same level of accuracy of predictions in VPLMN as in the HPLMN.

As will be discussed in detail in the following, certain example embodiments may be configured to generate an analytics profile for a UE, which can be shared between a HPLMN and VPLMNs based on security policies and/or privacy policies.

An embodiment may include generating an AF based UE profile. According to this embodiment, a UE can provide preference(s) of a user of the UE to the AF or a NF of the core network, which may include user preferences in the VPLMN. Alternatively or additionally, the user preference (s) can be provided by the AF based on user profiling or processing the user preference(s). The AF may then generate and/or store the AF based UE profile that includes the user preference(s) in the VPLMN. As some examples, the user preferences may include, but is not limited to, user shopping capacity in a first PLMN (e.g., $5000 in one month), user shopping preference (e.g., sports clothes, jewelry, fashion, games, etc.), user shopping type (e.g., regular or sporadic), and/or sightseeing/vacation preference (e.g., historical, modern art, beach, etc.), or the like. In an embodiment, the AF can provide the AF based UE profile to a H-NWDAF or NF.

According to certain embodiments, the NWDAF may be configured to generate a UE analytics profile. For example, the NWDAF may be configured to obtain data, utilize the AF based UE profile discussed above, generate analytics for the UE, and generate the UE analytics profile associated with the UE accordingly. For example, the UE analytics profile associated with the UE may include one or more of the following information: user mobility frequency, user mobility stability, user travel history, information related to the AF based UE profile discussed above, UE location analytics reports, UE communication behavior analytics reports, user quality of service (QoS) or congestion experience analytics reports, and/or UE data usage analytics reports. In some examples, the user mobility frequency can be identified as high or low, or more fine-granular levels can be defined. According to some embodiments, the user mobility stability can be identified as high or low, or more fine-granular levels can be defined. In some embodiments, the user mobility frequency or user mobility stability can also be differentiated for "business trip" versus "vacation". In one example, the user travel history might include analytics on travel patterns or travel type.

Some embodiments may be configured to store a UE analytics profile in UDM or a central repository. For example, the NWDAF can update the UE analytics profile (e.g., periodically or when sufficient new UE related data is obtained) and store the data in a central repository. In an embodiment, the central repository can be an analytics data repository function (ADRF).

Further example embodiments may provide a roaming consent and/or privacy filter for VPLMNs. Currently, the roaming consent is limited to yes/no for use of user data for NWDAF analytics or model training in the HPLMN. Some embodiments may be configured to extended the roaming consent to include a consent to share specific data with specific VPLMNs or regions (e.g., specific countries or the European Union as a whole). This extended roaming consent may be referred to herein as VPLMN specific consent or user consent. For instance, in an embodiment, the user may provide VPLMN or country/area-specific consent details to operators of the HPLMN, and the operators of the HPLMN may store the data in UDM/UDR with extended consent information comprising the VPLMN or country/area-specific consent details. If country or area-specific consent is provided, the operator of a HPLMN can convert the consent to VPLMN specific consent. Alternatively or additionally, based on the regulations of the country, a VPLMN specific consent/privacy filter can be defined by the network operator of the HPLMN. In an embodiment, since the UDM of the HPLMN already stores data per PLMN, a roaming consent/ privacy filter may be stored per VPLMN in the UDM. Alternatively or additionally, the roaming consent/privacy filter can be stored in the ADRF.

In certain embodiments, a NWDAF of a VPLMN may be configured to retrieve the UE analytics profile from the HPLMN. For example, when a UE registers in a VPLMN where the V-NWDAF does not have any data related to the UE or where the V-NWDAF has data but could benefit from additional data from the HPLMN, the V-NWDAF can discover the HPLMN network via subscription permanent identifier (SUPI) (e.g., mobile country code (MCC), mobile network code (MNC)) and can contact ADRF to download the UE AI/ML profile. Alternatively, the V-NWDAF may contact the H-NWDAF which can obtain the UE analytics profile associated with the UE from the ADRF if it does not already have the UE analytics profile associated with the UE. It is noted that, in this case, the H-NWDAF may filter the UE analytics profile associated with the UE, as described below, to generate a visited network UE analytics profile, before transmitting the visited network UE analytics profile associated with the UE to the V-NWDAF. The visited network UE analytics profile associated with the UE may include the information in the UE analytics profile associated with the UE that is applicable to the specific VPLMN.

Some embodiments may be configured to filter the UE analytics profile based on the VPLMN specific consent or user consent mentioned above. For example, before sending the UE analytics profile associated with the UE to the V-NWDAF of the VPLMN, an ADRF can apply VPLMN specific consent to the UE analytics profile associated with the UE or perform a user consent check on the UE analytic profile associated with the UE with the help of information available in the UDM. Alternatively, the filtering may be performed by the H-NWDAF. Table 1 below provides examples of UE profile attributes that can be provided, removed, and/or anonymized as a result of the filtering of the UE analytics profile associated with the UE using the VPLMN specific consent or user consent. For instance, the UE profile attributes may include user mobility information (e.g., user mobility frequency or stability), user location information, user preference information (e.g., user shopping information or user travel history), as well as analytic(s) reports including information related to the UE.

TABLE 1

| UE profile attributes | Action for PLMN1 | Action for PLMN2 |
|---|---|---|
| User Mobility frequency | Provided | Not Provided |
| User shopping capacity | Removed | Removed |
| User travel history | Anonymize | Not provided |
| Shopping preference | Provided | Provided |
| . . . | . . . | |

It should be noted that, although certain embodiments discussed herein use NWDAF as an example, some embodiments are also applicable to other analytics service or function, such as MDAS/MDAF. Also, in some embodiments, the UE analytics profile may also contain analytics information, as well as ML models, from multiple data analytics functions.

FIG. 1 illustrates an example signaling diagram for generating and sharing a UE analytics profile between a HPLMN and VPLMN, according to an example embodiment. As illustrated in the example of FIG. 1, at 110, the UDM 101 of the HPLMN may provide an option to store the VPLMN specific user consent or regulation filter information. Alternatively or additionally, a user consent or regulation filter information can be stored in a HPLMN ADRF 102.

In the example of FIG. 1, HPLMN NWDAF(s) 103 may generate analytics (e.g., statistics or predictions) associated with a UE. To do so, HPLMN NWDAF(s) 103 may obtain data related to the UE. Based on the obtained data related to the UE, at 120, the NWDAF(s) 103 may transmit a request message to generate and/or update a UE analytics profile and store the UE analytics profile in the HPLMN ADRF 102. In the example of FIG. 1, the HPLMN ADRF 102 may transmit an OK response message, at 130, to the NWDAF(s) 103.

As further illustrated in the example of FIG. 1, at 140, when or after the UE attaches to a VPLMN, the VPLMN NWDAF 104 may be requested or triggered to provide analytics for the UE. However, the VPLMN NWDAF 104 may not be able to generate accurate analytics for the UE because it lacks any related historical data for the UE. As a result, prediction accuracy may be low. Therefore, as illustrated in the example of FIG. 1, at 150, the VPLMN NWDAF 104 may transmit a request to the HPLMN ADRF 102 to retrieve the UE analytics profile for the UE. In some embodiments, the HPLMN ADRF 102 may contact the UDM 101 in the HPLMN and retrieve the VPLMN specific user consent or regulation related filter information and then, at 160, may dynamically apply the filter to the UE analytics profile to filter out the information specific to the VPLMN, for example, as illustrated in TABLE 1 where the VPLMN could be PLMN1. It is noted that the filter may vary for each PLMN as the content may change. For example, as discussed above, the HPLMN ADRF 102 may apply a VPLMN specific filter or user consent filter with the help of information available in the UDM. As a result, certain UE profile attributes in the UE profile may be provided, removed and/or anonymized. It is noted that, in some embodiments, the filtering at 160 may alternately be performed by the HPLMN NWDAF. At 170, the HPLMN ADRF 102 may provide, to the VPLMN NWDAF 104, the UE analytics profile as modified or filtered for the VPLMN.

As illustrated in the example of FIG. 1, at 180, the VPLMN NWDAF 104 may use the received UE analytics profile to generate analytics or predictions related to the UE when in the VPLMN. If VPLMN NWDAF 104 desires and it is allowed by the user consent information contained in the UE analytics profile, at 190, the VPLMN NWDAF 104 can store the UE analytics profile in the VPLMN ADRF 105, which can then be used further if the UE returns to the same network later. In the example of FIG. 1, the VPLMN ADRF 105 may provide an OK response message to the VPLMN NWDAF 104.

It is noted that FIG. 1 is provided as one example according to certain embodiments. However, other examples or modifications to FIG. 1 are possible according to some embodiments. For instance, although FIG. 1 depicts NWDAF as the analytics service/node, the NWDAF may be replaced by a MDAS, MDAF, or another node.

FIG. 2 illustrates an example flow diagram of a method of generating, updating and/or filtering a UE analytics profile that can be shared between PLMNs while taking into consideration a security policy and/or privacy policy for the UE, according to one example embodiment. In certain example embodiments, the flow diagram of FIG. 2 may be performed by a network entity, network node, or apparatus in a mobile or wireless telecommunications system, such as, but not limited to, LTE, 5G, or 5G beyond. In some example embodiments, the network entity performing the method of FIG. 2 may include a data analytics function, such as a NWDAF, MDAS, MDAF, ADRF, or UDM. For instance, in certain example embodiments, the method of FIG. 2 may include procedures or operations performed by the network entity, network node, or apparatus that includes the HPLMN NWDAF, HPLMN ADRF and/or HPLMN UDM depicted in the example of FIG. 1.

In an example embodiment, as illustrated in the example of FIG. 2, a method may include, at 205, obtaining data related to a UE and generating analytics related to the UE based on the obtained data related to the UE. According to an embodiment, the obtained data related to the UE may be data that is obtained to generate different types of analytics for the UE. It is noted that the obtained data related to UE can include raw data, analytics information, ML model, and/or user consent information, etc. For example, in some embodiments, the obtaining 205 may include obtaining the data from an AF based UE profile that may include user preferences in a visited network (e.g., VPLMN). For instance, the user preferences in a visited network (e.g., VPLMN) may include, but are not limited to, user shopping capacity, shopping preferences, shopping type, vacation preference, etc.

As further illustrated in the example of FIG. 2, the method may include, at 210, generating a UE analytics profile associated with the UE using the obtained data and/or analytics generated for the UE and, at 215, storing the UE analytics profile in a repository, such as a UDM, UDR, or ADRF. In some embodiments, the UE analytics profile may include information including one or more of: user mobility information (e.g., user mobility frequency, user mobility stability, etc.), user preference information (e.g., user travel history, user shopping history, vacation preference, etc.), information related to an application function (AF) based UE profile, and/or analytics report(s) including analytics information related to the UE (e.g., user equipment location analytics reports, user equipment communication behavior analytics reports, user quality of service or congestion experience analytics reports, and/or user equipment data usage analytics reports, etc.). According to certain embodiments, the method may include updating the UE analytics profile periodically or when a certain amount of new UE related data is obtained.

In some embodiments, a user consent filter, roaming consent filter and/or privacy filter for the UE or for the PLMN may be obtained from a UDM, for example. As depicted in the example of FIG. 2, the method may also include, at 220, storing the user consent filter, roaming consent filter and/or privacy filter for the UE or for the PLMN. For example, the user consent filter, roaming consent filter and/or privacy filter may include whether the user consents to share one or more of the information in the UE analytics profile with specific PLMNs and/or regions including multiple PLMNs.

According to certain embodiments, when or after the UE registers in a visited network, the method may include, at 225, receiving, from a network data analytics node in the visited network, a request to retrieve the UE analytics profile for the visited network or VPLMN (e.g., a visited network UE analytics profile). The method may then include, at 230, generating the visited network UE analytics profile from the UE analytics profile. In an embodiment, the generating 230 may include applying the user consent, roaming consent and/or privacy filter to filter the UE analytics profile such that just the information that has user consent to share is included in the visited network UE analytics profile. For example, as a result of the filtering, certain UE profile attributes in the UE profile may be provided, removed and/or anonymized. In an embodiment, the method may include, at 235, providing the visited network UE analytics profile to the network data analytics node in the visited network.

FIG. 3 illustrates an example flow diagram of a method of generating, updating and/or filtering a UE analytics profile that can be shared between PLMNs while taking into consideration user consent, a security policy and/or privacy policy for the UE, according to one example embodiment. In certain example embodiments, the method shown in FIG. 3 may be performed by a network entity, network node, or apparatus in a mobile or wireless telecommunications system, such as, but not limited to, LTE, 5G, or 5G beyond. In some example embodiments, the network entity, network node or apparatus performing the method of FIG. 3 may include a data analytics function, such as a NWDAF, MDAS, MDAF, ADRF, or UDM. For instance, in certain example embodiments, the method of FIG. 3 may include procedures or operations performed by the VPLMN NWDAF and/or VPLMN ADRF depicted in the example of FIG. 1.

In an example embodiment, as illustrated in the example of FIG. 3, the method may include, at 305, when or after a UE attaches to a visited network, transmitting a request, to a network node, network entity or apparatus that includes the data analytics function (e.g., HPLMN NWDAF) in a home network (e.g., HPLMN) of the UE, to retrieve an analytics profile associated with the UE. For instance, in one embodiment, the transmitting 305 of the request may occur when or after the VLPMN NWDAF receives a first request for analytics related to the UE.

As discussed above, in some embodiments, the UE analytics profile associated with the UE may include information including one or more of: user mobility information (e.g., user mobility frequency, user mobility stability, etc.), user preference information (e.g., user travel history, user shopping history, vacation preference, etc.), information related to an AF based UE profile, and/or analytics report(s) including analytics information related to the UE (e.g., user equipment location analytics reports, user equipment communication behavior analytics reports, user quality of service or congestion experience analytics reports, and/or user equipment data usage analytics reports, etc.).

According to certain embodiments, the method of FIG. 3 may include, at 310, receiving, from the network node, network entity or apparatus that includes a data analytic function of the home network (e.g., HPLMN) of the UE, the UE analytics profile associated with the UE. In one embodiment, the UE analytics profile associated with the UE may be a visited network UE analytics profile associated with the UE (i.e., a UE analytic profile for the visited network (e.g., VPLMN)) that has been generated using a user consent filter, roaming consent filter and/or a privacy filter. For example, the user consent filter, roaming consent filter and/or privacy filter may include user consent to share none, some or all of the information in the UE analytics profile with specific PLMNs and/or regions. The roaming consent filter may be a filter for a VPLMN that is per-user based on user preferences. The privacy filter may be a filter for a VPLMN that is per-PLMN based on preference of operators and local regulations. In an embodiment, the receiving 310 may include receiving the visited network UE analytics profile from the network node, network entity or apparatus that includes the data analytic function of the home network (e.g., HPLMN) of the UE.

As illustrated in the example of FIG. 3, the method may further include, at 315, generating analytics (e.g., statistics or predictions) related to the UE based on the received, visited network UE analytics profile associated with the UE. In some embodiments, the method may optionally include, at 320, storing the generated analytics profile associated with the UE in a repository of the visited network (e.g., VPLMN), if allowed by the user consent. The stored or updated analytics profile of the UE can then be used further if the UE later returns to the visited network (e.g., VPLMN).

Figure 4:
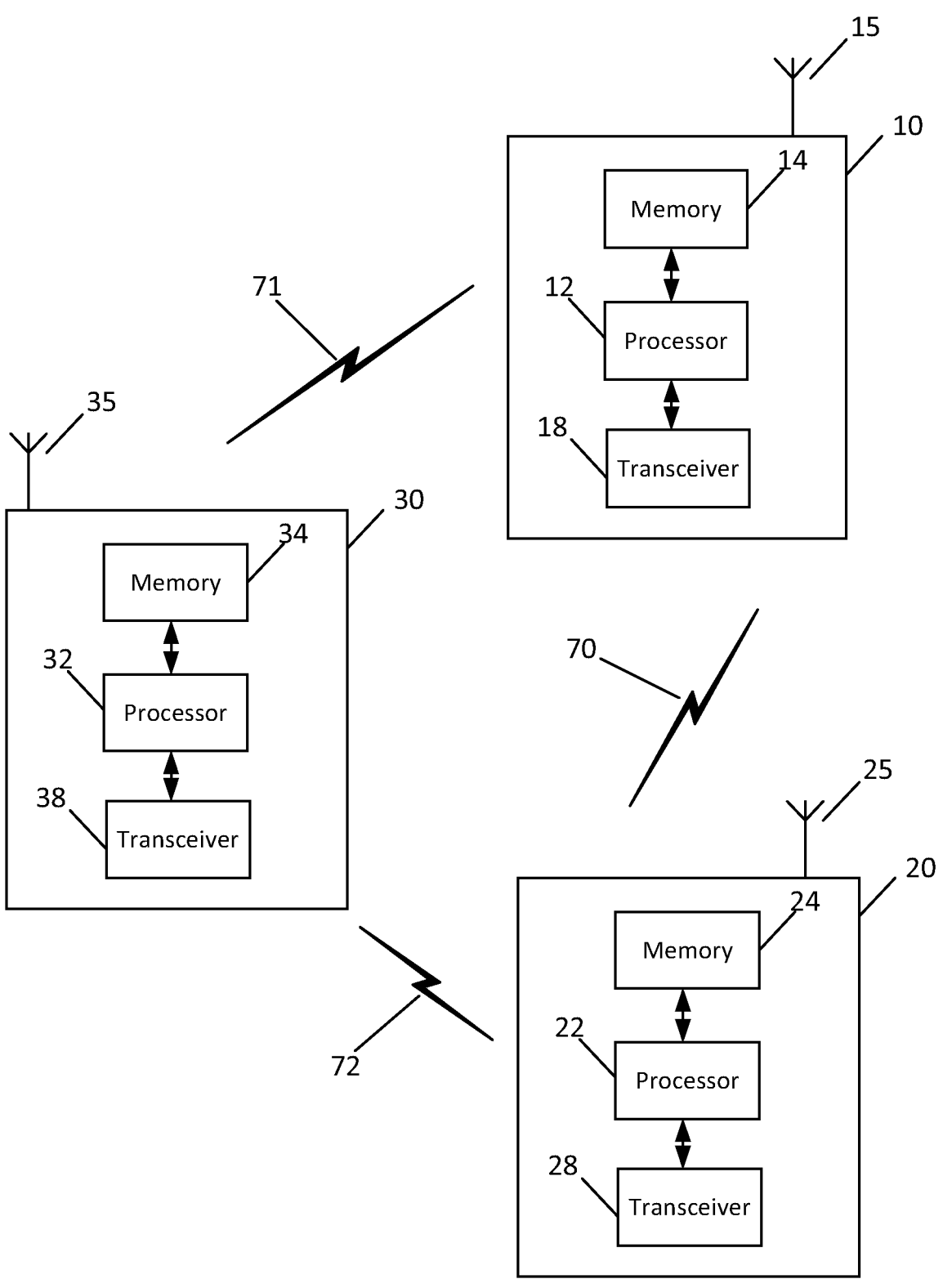
FIG. 4 illustrates an example of a system including multiple apparatuses, according to certain embodiments.

FIG. 4 illustrates an example of an apparatus 10, apparatus 20, and apparatus 30, according to certain example embodiments. In an example embodiment, apparatus 10 may be a node, host, or server in a communications network.

Apparatus 10 may be or may be included in a network node. According to some example embodiments, apparatus 10 may include a data analytics function, such as a NWDAF, management data analytics service (MDAS), management data analytics function (MDAF), analytics data repository function (ADRF) and/or unified data management (UDM).

It should be understood that, in some example embodiments, apparatus 10 may be comprised of a cloud computing system or a distributed computing system of a network, such as the HPLMN or the VPLMN. It should be noted that one of ordinary skill in the art would understand that apparatus 10 may include components or features not shown in FIG. 4.

As illustrated in the example of FIG. 4, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. In certain example embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources. In certain examples, processor 12 may be configured as a processing means or controlling means for executing any of the procedures described herein.

Apparatus 10 may further include or be coupled to a memory 14 (internal or external), which may be coupled to processor 12, for storing information and instructions that may be executed by processor 12, including instructions of a data analytics function, such as a NWDAF. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein. In certain example embodiments, memory 14 may be configured as a storing means for storing any information or instructions for execution as discussed elsewhere herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of LTE, 5G, WLAN, Bluetooth, BT-LE, NFC, radio frequency identifier (RFID), ultrawideband (UWB), Multe-Fire™, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. In certain example embodiments, transceiver 18 may be configured as a transceiving means for transmitting or receiving information as discussed elsewhere herein. Additionally or alternatively, in some example embodiments, apparatus 10 may include an input and/or output device (I/O device) or means.

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some example embodiments, processor 12 and memory 14 may be included in or may form a part of processing circuitry or control circuitry. In addition, in some example embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

According to some example embodiments, apparatus 10 may represent or may be a data analytics node that implements a data analytics function, such as a NWDAF, management data analytics service (MDAS), management data analytics function (MDAF), analytics data repository function (ADRF) or a unified data management (UDM), or the like. For example, in some example embodiments, apparatus 10 may be configured to perform one or more of the processes depicted in any of the flow charts or signaling diagrams described herein, such as FIGS. 1-3. In some example embodiments, as discussed herein, apparatus 10 may be configured to perform a procedure relating to network data analytics UE profiling that can be shared between PLMNs while taking into consideration security and privacy policy, for instance. Thus, according to certain example embodiments, apparatus 10 may be controlled by memory 14 and processor 12 to perform at least the method depicted in the example of FIG. 2.

FIG. 4 further illustrates an example of an apparatus 20, according to an example embodiment. In an example embodiment, apparatus 20 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 20 may be NG-RAN node, an eNB in LTE, or gNB in 5G. According to some example embodiments, apparatus 20 may represent or may be included in a network data analytics node, such as a NWDAF, management data analytics service (MDAS), management data analytics function (MDAF), analytics data repository function (ADRF) or unified data management (UDM), for example.

In some example embodiments, apparatus 20 may include one or more processors, one or more computer-readable storage medium (for example, memory, storage, or the like), one or more radio access components (for example, a modem, a transceiver, or the like), and/or a user interface. In some example embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4.

As illustrated in the example of FIG. 4, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an example embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some example embodiments, apparatus 20 may include an input and/or output device (I/O device). In certain example embodiments, apparatus 20 may further include a user interface, such as a graphical user interface or touchscreen.

In an example embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some example embodiments, processor 22 and memory 24 may be included in or may form a part of processing circuitry/means or control circuitry/means. In addition, in some embodiments, transceiver 28 may be included in or may form a part of transceiving circuitry or transceiving means.

FIG. 4 illustrates an example of an apparatus 30, according to an example embodiment. For example, apparatus 30 may be a UE, mobile equipment (ME), mobile station, mobile device, stationary device, IoT device, TSN device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 10 may be implemented in, for instance, a wireless handheld device, a wireless plug-in accessory, or the like. It should be noted that one of ordinary skill in the art would understand that apparatus 10 may include components or features not shown in FIG. 4.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, Bluetooth™ and/or any other radio access technologies. It should be noted that one of ordinary skill in the art would understand that apparatus 30 may include components or features not shown in FIG. 4.

As illustrated in the example of FIG. 4, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 4, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be or may be included in a UE, mobile device, mobile station, ME, IoT device and/or NB-IoT device, for example. According to certain example embodiments, apparatus 30 may be controlled by memory 34 and processor 32 to perform various functions and operations, such as attaching to a VPLMN as described in connection with FIG. 1.

In some example embodiments, an apparatus 10 may include means for performing one or more methods, processes and/or procedures, or any of the variants discussed herein. Examples of the means may include, but are not limited to, one or more processors, memory, controllers, transmitters, receivers, sensors, circuits, and/or computer program code for causing the performance of any of the operations discussed herein, such as those illustrated or discussed in connection with FIGS. 1-3.

In view of the foregoing, certain example embodiments provide several technological improvements, enhancements, and/or advantages over existing technological processes and constitute an improvement at least to the technological field of wireless network control and/or management. For example, as discussed in detail above, certain example embodiments can provide systems, apparatuses, devices and/or methods for generating, updating and/or filtering UE analytics profile associated with a UE that can be shared between a HPLMN and VPLMNs while taking into consideration a security policy and/or a privacy policy. As a result of certain embodiments, the NWDAF in a VPLMN or any AI/ML engine of the VPLMN, such as a MDAS or MDAF, will be able to generate accurate statistics and/or provide accurate predictions for the UE. Accordingly, the use of certain example embodiments results in improved functioning of communications networks and their nodes, such as base stations, eNBs, gNBs, and/or IoT devices, UEs or mobile stations, or the like.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations needed for implementing the functionality of an example embodiment may be performed as routine (s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, some functionality of example embodiments may be implemented as a signal that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Some embodiments described herein may use or refer to the conjunction "and/or". It should be noted that, when used, the term "and/or" is intended to include either of the alternatives or both of the alternatives, depending on the example embodiment or implementation. In other words, "and/or" can refer to one or the other or both, or any one or more or all, of the things or options in connection with which the conjunction is used.

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

NWDAF—Network Data Analytics Function
ADRF—Analytics Data Repository Function
PLMN—Public Land Mobile Network
HPLMN—Home PLMN
VPLMN—Visited PLMN
We claim:
1. An apparatus, comprising:
at least one processor; and
at least one memory comprising computer program code of a data analytics function of a home network, wherein the computer program code, when executed by the at least one processor, cause the apparatus to perform operations, the operations comprising:

obtaining data related to a user equipment (UE) and generating analytics for the UE based on the data that is obtained;

generating a home network UE analytics profile associated with the home network UE analytics profile comprising the analytics generated for the UE;

storing the home network UE analytics profile in a repository of the home network;

receiving, from a data analytics function of a visited network of the UE, a request for a visited network UE analytics profile associated with the UE;

generating the visited network UE analytics profile associated with the UE based on the home network analytics profile associated with the UE and user consent filter information associated with a user of the UE for the visited network, wherein the user consent filter information comprises consent of the user to share one or more of information included in the home network UE analytics profile with at least the visited network or in regions comprising the visited network; and transmitting the visited network UE analytics profile associated with the UE to the data analytics function of node in the visited network.

2. The apparatus of claim 1, wherein the obtaining comprising obtaining the data from an application function (AF) based UE profile that comprises user preferences of a user of the UE for the visited network.

3. The apparatus of claim 1, wherein the operations further comprise retrieving, from a data repository, the user consent filter information associated with the user of the UE for the visited network or regulation filter information for the visited network.

4. The apparatus of claim 3, wherein the generating the visited network UE analytics profile comprises applying the at least one of the user consent filter information or the regulation filter information to the home network UE analytics profile.

5. The apparatus of claim 4, wherein the home network UE analytics profile comprises information including at least one of:

mobility information associated with the UE;

preference information associated with the user of the UE;

information related to an application function (AF) based UE profile; or one or more analytics reports including information related to the UE (UE).

6. The apparatus of claim 1, wherein the operations further comprising updating the home network UE analytics profile periodically or when a pre-determined amount of new data related to the UE is obtained.

7. The apparatus of claim 1, wherein the data analytics function of the visited network comprises a network data analytics function (NWDAF).

8. The apparatus of claim 1, wherein the data analytics function comprises at least one of a network data analytics function (NWDAF), a management data analytics service (MDAS), a management data analytics function (MDAF), an analytics data repository function (ADRF) or a unified data management (UDM) of a home network of the.

9. An apparatus, comprising:

at least one processor; and at least one memory comprising computer program code of a data analytics function of a visited network, the computer program code being configured to, when executed by the at least one processor, cause the apparatus at least to perform operations, the operations comprising:

transmitting a request to a data analytics function of a home network of a user equipment (UE), to retrieve a visited network UE analytics profile associated with the UE;

receiving, from the data analytics function of the home network of the UE, the visited network UE analytics profile associated with the UE, wherein the visited network UE analytics profile associated with the UE is based on a home network UE analytics profile associated with user consent filter information associated with a user of the UE for the visited network, wherein the user consent filter information comprises consent of the user to share one or more of information included in the home network UE analytics profile with at least the visited network or in regions comprising the visited network; and generating analytics for the UE based on the visited network UE analytics profile associated with the UE that is received.

10. The apparatus of claim 9, wherein the operations further comprise storing the visited network UE analytics profile of the UE in a repository of the visited network or updating the visited network UE analytics profile of the UE stored in the repository of the visited network.

11. The apparatus of claim 9, wherein the visited network UE analytics profile comprises information including—at least one of:

mobility information associated with the UE;

preference information associated with the user of the UE;

information related to an application function (AF) based UE profile; or one or more analytics reports including analytics information related to the UE.

12. The apparatus of claim 11, wherein the home network UE analytics profile is filtered for the visited network based on the user consent filter information.

13. The apparatus of claim 9, wherein the data analytics function comprises of a network data analytics function (NWDAF), a management data analytics service (MDAS), a management data analytics function (MDAF), an analytics data repository function (ADRF) or unified data management (UDM), and wherein the data analytics function of the home network of the UE comprises at least one of a network data analytics function (NWDAF), a management data analytics service (MDAS), a management data analytics function (MDAF), an analytics data repository function (ADRF) or a unified data management (UDM) of the home network of the UE.

* * * * *